Figure 1:
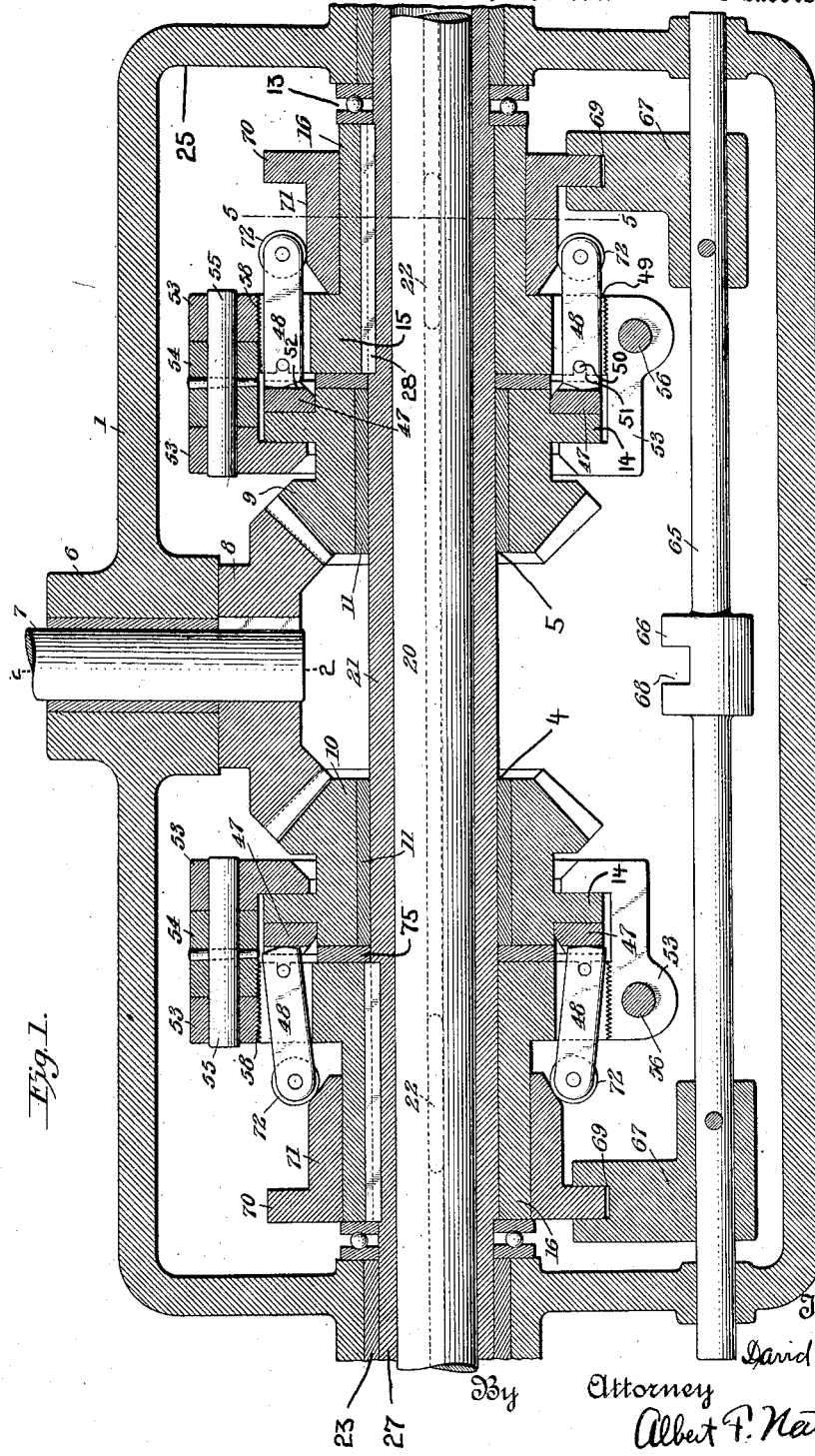

Aug. 12, 1924.

D. C. KLAUSMEYER

DISK CLUTCH REVERSER

Filed May 28, 1921

1,505,074

3 Sheets-Sheet 1

Inventor
David C Klausmeyer
By Attorney
Albert F. Nathan

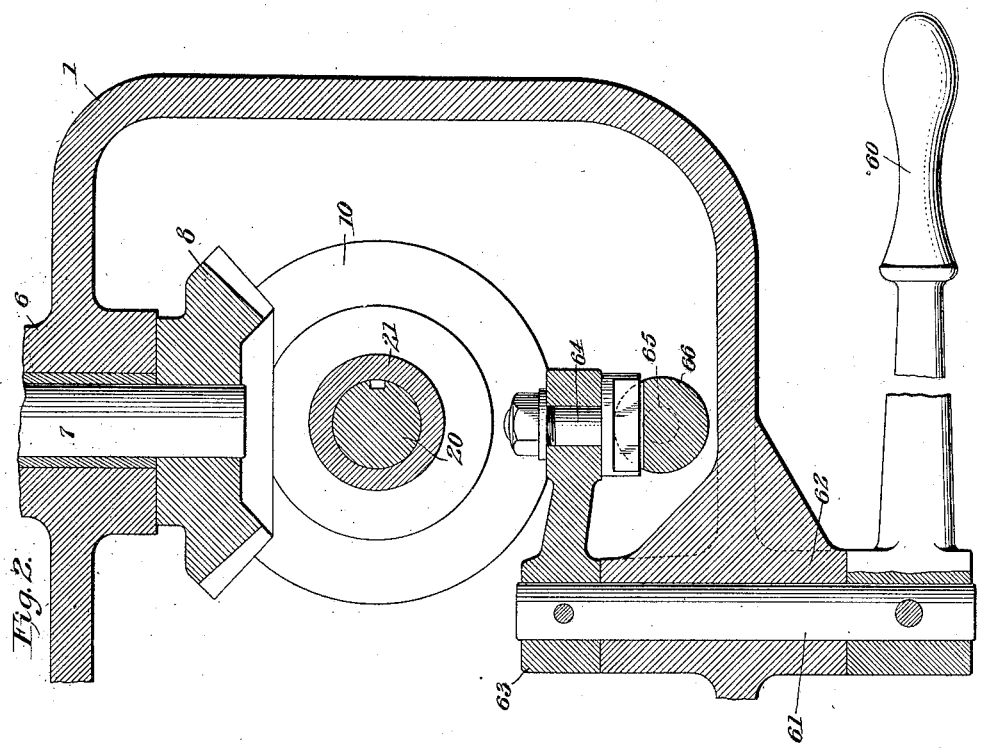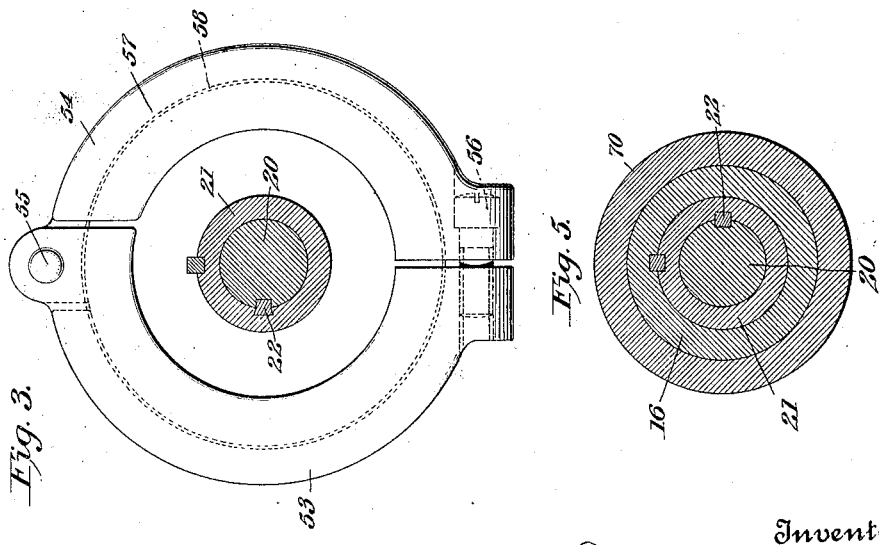

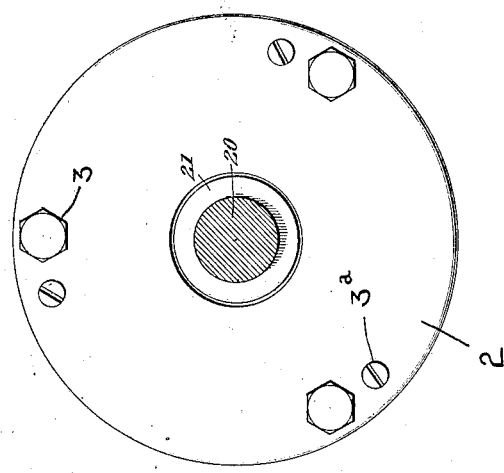
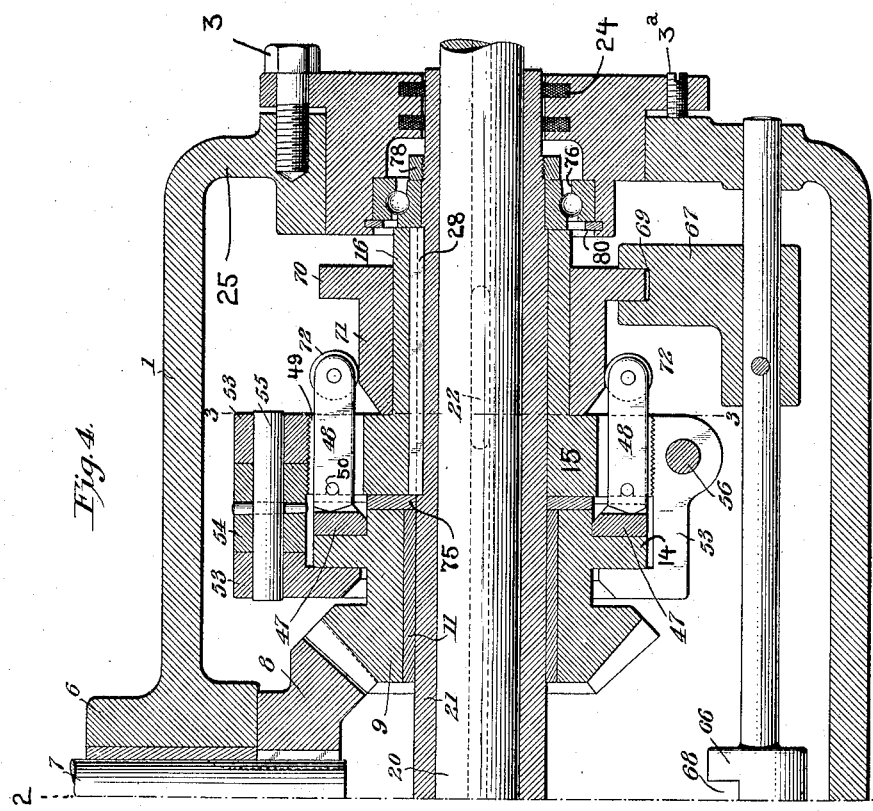

Patented Aug. 12, 1924.

1,505,074

UNITED STATES PATENT OFFICE.

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO.

DISK CLUTCH REVERSER.

Application filed May 28, 1921. Serial No. 473,323.

*To all whom it may concern:*

Be it known that I, DAVID C. KLAUSMEYER, a citizen of the United States, and residing at Cincinnati, in the county of Hamilton and State of Ohio, have invented a new and Improved Disk Clutch Reverser, of which the following specification is a full disclosure.

This invention relates to reversing mechanisms of the friction type and it aims to reconcile smoothness and positiveness in operation with a high degree of structural compactness.

Wherever friction is depended upon to transmit considerable power, or to effect changes in speed, or reversals in direction, the efficiency and durability depends very greatly upon the accurate maintenance of the the co-axial relation of the parts and upon the character and structural arrangements of the elements of the clutch mechanism. Among the various types of clutches, the disk-type for many purposes possess distinct advantages, but ordinarily it is difficult to utilize that type when great compactness is of paramount importance. In the case of drilling-machines, it is not only necessary to obtain reversals in motion but the ultimate speeds must be obtained sufficiently gradually to avoid shocks to the mechanism or the tool and yet the clutch must be sufficiently powerful to maintain the ultimate speed without slipping so that the tool can perform its work. All of this must, furthermore, be done through an instrumentality which affords a relative longitudinal or feeding movement between the spindle or shaft and the clutch unit, and this naturally increases the difficulties because this longitudinal movement would result in additional wear and looseness if the working elements should be mounted directly on the shaft.

It is, accordingly, an object of this invention to provide a motion-reverser in the nature of a unit in combination with a shaft freely translatable relatively to the unit and in which the operating elements will be mounted (independently in the shaft) on a rotatable sleeve journaled at its ends in fixed portions or end-walls of the frame and in which the gears will be very compactly nested and arranged to transmit power through friction clutches of the disk-type mounted on the end portions of the rotatable sleeve; together with an instrumentality for connecting either one or the other of the coaxial gears with the sleeve by means of a compactly mounted manually operative clutch actuator.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views of which:—

Fig. 1 is a longitudinal section showing the general assembly of the elements of this device. Fig. 2 is a transverse section taken along a medial of Fig. 1 showing the arrangement of the lever for operating the clutches. Fig. 3 is a section through line 3—3 of Fig. 4; certain parts being omitted. Fig. 4 is a fragmentary longitudinal section showing a slight modification of the mounting of the clutches on the rotatable sleeve. Fig. 5 is a section through line 5—5 of Fig. 1 showing the manner of connecting the clutches with the shaft. Fig. 6 is an end view of the bearing-cap.

Continuing now by way of an analysis of the herein illustrated examples of this invention, 1 indicates a frame for supporting and positioning the major elements of the device. While this frame may be open, it will be formed in the nature of a closed casing in the preferred aspect of this invention, so that the various bearings may be shielded against grit and may be run in a bath of oil or grease. This frame is characteristically provided with means for providing stationary journals for the mounting of the ends of a rotating sleeve which in turn supports two conversely-rotating bevel-gears. A convenient way of achieving that end is illustrated in Figs. 1 and 4, wherein 2 indicates a bearing cap adjustably mounted on an end-wall of the casting; it being adjustably yet firmly affixed thereto by screws 3. This rotatable sleeve is formed with an enlarged intermediate portion affording journals 4 and 5 upon which the conversely rotating bevel-gears are mounted.

The casing 1 is provided with a bearing 6 located intermediate the ends of the rotatable sleeve 21 and this receives a shaft 7 having affixed to its inner end a bevel-gear 8 which, accordingly, faces the rotatable sleeve 21 substantially midway its ends. Mounted on the journals 4 and 5, are two bevel-gears 9 and 10 which are in mesh with the bevel-gear 8, as shown by Fig. 1. As will be understood, the effect of this intermesh is to urge the gears 9 and 10 away from the axis 2—2 of the shaft 7 and, in order to limit this movement, suitable thrust-bearings are provided adjacent of outer faces of the gears 9 and 10. These gears are rotatably, as well as translatably, mounted on the journals 4 and 5 (as for example through the agency of the brass bushing 11) so as freely to admit of lateral movement against the said thrust bearing. In the course of time, sufficient wear will take place to impair the original precision of the intermesh and, therefore, provision is made for adjusting the gears toward the axis line 2—2. To that end, the cap 2 is telescoped in the end of the stationary frame 1 so that it may be adjusted towards the axis line 2—2; a thrust bearing 13 (preferably of the ball type) being interposed for the purpose of decreasing friction and wear. Inasmuch as both the gears 9 and 10 are journaled on a single element, they admit of being held very closely in an accurate co-axial relation; there being no intervening loose elements to impair the precision of the mount.

The gear 9 is of small diameter and its bore is comparatively small so that, while permitting the gear 8 to be set close to the central axis of the spindle, it will nevertheless run smoothly. While such gear may have its outer portion configurated in any manner appropriate to the type of clutch used, it will be noted that the example illustrated presents a very desirable characteristic: to wit, it merely has a simple disk-like flange 14 of small diameter formed on its end; thereby avoiding the complicated cup-like formations heretofore demanded to meet the necessities of clutches of the expanding ring type previously required for various structural reasons in mechanisms of this general nature. It is, of course, much cheaper to manufacture gears of the simple form shown in the herein illustrated preferred embodiment of this invention, since the disk-flange 14 may be formed from the original blank without requiring the removal of any great amounts of stock which, of course, is of high-grade expensive steel.

This flange 14 may be regarded as the male member of the clutch or, as a matter of nomenclature, the clutch may be referred to as consisting of the various movable and adjustable elements comprising the separate unit now to be described. This device comprises a body proper 15 having a hub 16 in the form of a sleeve.

The arrangement proposed by this invention admits of various mounting of the clutch-member 15; as will be perceived by comparing Figs. 1, 4 and 6. Thus, it may be carried directly by the rotary sleeve on which the gear 9 is directly journaled.

The general object of motion reversers of the sort in view, is to enable motion to be transmitted from a shaft 7 to another shaft 20 arranged at an angle thereto; usually in the same axial plane therewith and usually also at right-angles thereto, but not necessarily so. The shaft 20, however, must admit of being translated in an axial direction relative to the shaft 7 without any break in the connection but otherwise accurately preserving the spatial relations between the two. The shaft 20 is, accordingly so journaled (either directly or indirectly) with respect to the frame that the aforesaid relation will be preserved, and also so connected (either directly or indirectly) with the clutch as to preserve the driving relation in all of its positions. The former may be achieved indirectly by resorting to an intervening sleeve arranged, on the one hand, to serve as a bearing for the shaft and being, on the other hand, itself journaled in the end walls of the casing. Thus, as shown by Fig. 1 the elongated tubular sleeve 21 is splined to the shaft 20 by means of the key 22 and is also (as by means of bushings 23) journaled at its ends within a fixture or part of the casing. These journals 23 are located near the ends of the fixed sleeve, as shown, so as to ensure accuracy in alignment and, in case a closed casing be used, the rotary sleeve preferably will extend into openings 24 in either the adjustable cap 2 or directly in the end-walls 25 thereof to make provision for dust-guards 26 in the nature of packing adapted to prevent undue leakage of the lubricant. The end-portion 27 of the rotary sleeve may also be journaled directly in said openings if desired (as shown by Fig. 1) to ensure the alignment and, to restrict the end-play, the rotary sleeve may be provided with an ample shoulder 28, as shown by Figs. 1 and 4, bearing (through the intervening key 74 and a thrust bearing) against the end-wall of the casing. The thrust-bearing may be of the form shown by 13 in Fig. 1 and wear may be compensated for by a replacement of this bearing or of the washer 75. As shown by Fig. 4, the ball bearing 77 carries both the thrust and the side strains and adjustment is also afforded by a nut 78 screw-threaded to the end-portion of the sleeve and located in a socket in the cap 2.

As has been stated, this invention admirably admits of the use of disk-clutches, as for example of the construction shown.

Here, the clutch comprises an annular shoe 47 arranged adjacent the annular flange 14 of the gear. This shoe 47 is urged against said flange by means of several symmetrically arranged levers 48 arranged in slots 49 cut in the periphery of the portion 15 and positioned by means of pivot-pins 50 secured to the levers and projecting from the sides thereof; the projecting ends of the pivot-pins being seated in a recess 51 cut in the face of the flange 18. The inner end of the lever rests against the side of the shoe 47; preferably in a notch 52 so as to prohibit any rotation of the shoe relative to the clutch-member 15.

The thrust resulting from the pressure of the shoe is, on the other side of the flange 14, resisted by an annular member which, for ease of assembly, may be made, as shown by Fig. 3, of two half-rings 53 and 54 hinged together by the pin 55 to form a complete circle. These half rings have flanges 57 that are interiorly screw-threaded, as indicated by 58, so as to be adjustably affixed to the flange 18 of the clutch-member 15. A screw 56 serves to bind the parts securely in place, as will be understood.

It will be noted that the clutch-parts are capable of a slight float or movement as a unit in an axial direction so that a degree of self-adjustment in conformity with the position of the flange 14, is thereby provided; thus avoiding the "drag" sometimes exhibited by faulty clutch designs.

To operate the clutches, a hand-lever 60 (Fig. 2) is affixed to a stub-shaft 61 journaled in a boss 62 provided by the frame or casing. To the inner end of such shaft 61, is affixed a lever 63 having a shoe 64 pivoted to its end and seated in a recess 68 provided by an enlargement 66 on the shift-rod 65. The latter is shown supported at its ends in the end-walls of the frame and it carries a member 67 having a slot 69 engaging a flange 70 projecting from a conical lever-actuator 71 which, when moved laterally, may engage rolls 72 on the ends of the levers and operate the clutches, as will be perceived.

The simplicity and compactness of the above revealed organization is, especially noteworthy and it will be seen that it overcomes certain troublesome features of previous designs and is rugged and not likely to become disarranged in use and may be assembled readily and subsequently adjusted as occasion demands to maintain accuracy and smoothness of action.

Without further analysis, the foregoing will so fully reveal the gist of this invention that others can, by applying current knowledge, readily adapt it for various utilizations without omitting certain features that, from the standpoint of the prior art, fairly constitute essential characteristics of the generic or specific aspects of this invention, and therefore such adaptations should be and are intended to be comprehended within the meaning and range of equivalency of the following claims.

Having thus revealed this invention, I claim as new and desire to secure the following combinations and elements, or equivalents thereof, by Letters Patent of the United States:—

1. A motion-transmitter combining a clutch unit presenting an open end having an internal annular recess; a gear having an annular flange at the end of its hub located in said annular recess; an annular shoe adjacent the outer face of said flange; a pressure element for clamping said gear flange between said shoe and a side-face of said annular recess; a tubular member on which said gear is journaled; a frame providing journals for the ends of said tubular member; and an axially-shiftable shaft translatably splined within the bore of said tubular member.

2. A motion-transmitter combining two conversely arranged mechanisms, each comprising a gear having an annular flange; a shiftable body-member presenting an annular brake-shoe adjacent a side-face of said flange; a member adjustably mounted on said body-member and having a flange adjacent the other side-face of the gear-flange; a lever carried by one of said members and adapted to urge said shoe against said gear-flange; a rotatable sleeve supporting said parts; a frame providing bearings for the ends of said sleeve; two spools shiftable on said sleeve for alternately operating said levers; hand-operated mechanism mounted by said frame for alternately shifting said spools; and a bevel-gear permanently meshing with said two gears.

3. A motion-reverser combining a frame; a rotary sleeve journaled in the end-walls of said frame; a shaft splined to and translatably extending through said sleeve; a bevel-gear facing said sleeve; two oppositely arranged bevel-gears meshing with said first gear and each journaled to rotate on the respective ends of said sleeve and out of contact with said shaft, each of said two gears having on its outer end an annular double-faced friction disk; a first clutch element operatively connected to said sleeve and arranged adjacent the outer end of a gear and having an annular face adjacent one side of said disk; a second clutch element having an annular face movable against the other face of said disk; a lever for effecting a relative movement of said clutch-elements; and mechanism for alternately engaging either clutch with its associated gear.

4. A motion-reverser combining a frame; an elongated sleeve journaled at its ends in portions of said frame; a shaft translatably extending through said sleeve; and splined thereto a bevel-gear facing said sleeve; two oppositely arranged bevel-gears meshing with said first gear and each journaled to rotate on the respective end-portions of said sleeve and out of contact with said shaft; an annular disk-like brake-element provided by each gear; two clutches operatively connected to said shaft and each arranged adjacent the outer ends of said gears, respectively, said clutches providing two annular jaws for clamping therebetween the associated disk-like brake-element; and means for alternately engaging either clutch with its associated gear.

5. A motion-reverser combining a frame; an axially-translatable rotary-shaft; two oppositely-disposed gears spaced apart in concentric relation with said rotary shaft; a sleeve journaled at its ends in said frame and providing journals for rotatably supporting said gears out of contact with said rotary shaft; two disk-type clutches mounted directly on said rotary sleeve adjacent the outer end of each gear, respectively; each of said gears providing a double-faced disk and each clutch comprising two annular jaw-like surfaces adapted to be closed to clamp therebetween said disk; and means embodying a lever pivoted transversely to the axis of said shaft for establishing a driving relation between either of said gears and its associated clutch.

6. A motion-reverser combining a shaft; two oppositely-disposed gears spaced apart in concentric relation with said shaft; a rotatable non-shiftable sleeve providing rotary journals for supporting said gears out of contact with said shaft; a frame, said sleeve being journaled at its ends in the end-walls of said frame, a disk-type clutch located on said sleeve adjacent each gear; a collar concentric with said sleeve adjacent said clutch; and means for shifting said collar relative to said sleeve for establishing a driving relation between either of said gears and its associated clutch.

7. A motion-reverser combining a frame; a non-translatable sleeve rotatably supported at its ends thereby; a shaft translatably extending through said sleeve; a bevel-gear facing said sleeve; two oppositely arranged bevel-gears meshing with said first gear and each journaled to rotate on the respective ends of said sleeve and out of contact with said shaft, each of said opposed bevel-gears having a two-faced flange; two clutch-members splined directly to said sleeve and shiftable thereon and located adjacent the outer ends of said gears, respectively; each of said clutch-members comprising two jaw-like parts each adapted to move slightly in an axial direction relative to said sleeve; and means for relatively moving said parts for connecting either clutch-member with its associated gear, said means being adapted to operate said clutch-members alternately.

8. An impositive frictional motion-reverser combining a frame; an elongated sleeve journaled at its ends in said frame; a shaft translatably extending through the bore of said sleeve and splined thereto; a bevel-gear journaled on said sleeve and having at its outer end a flange-like friction element; an annular member splined to said sleeve and located thereon between said gear and the adjacent end of said frame, said member being adapted to receive the end-thrust of said bevel-gear and limit the extent of retreat thereof; a ring-like friction element shiftable relative to said member; a lever pivoted to said member and adapted when actuated to cause said friction-elements to engage; a collar shiftable on said member and having a conical surface adapted to swing the end of said lever onto a circumferential seat adapted to retain said lever in its operative position; and means for limiting the retreat of said annular member under the back-pressure imposed by said bevel-gear upon said friction-elements.

9. An impositive frictional motion-reverser combining a frame; an elongated sleeve journaled at its ends in said frame; a shaft translatably extending through the bore of said sleeve and splined thereto; a bevel-gear journaled on said sleeve and having at its outer end a flange-like friction element; an annular member splined to said sleeve and located thereon between said gear and the adjacent end of said frame; a ring-like friction element shiftable relative to said member; a lever of the first-order pivotally mounted in a radial slot provided by said member and adapted when actuated to effect an engagement of said friction-elements; a collar shiftably mounted on the rear end of said member and having a conical surface adapted to direct the end of said lever onto an annular seat of uniform diameter adapted to retain said lever in its operative position; and means for limiting the retreat of said member, whereby it may cooperate to maintain the bevel-gear in a predetermined tooth-meshing position.

10. An impositive frictional motion-reverser combining a frame; an elongated sleeve journaled at its ends in said frame; a shaft translatably extending through the bore of said sleeve and splined thereto; a bevel-gear journaled on said sleeve, there being at its outer end a flange-like friction element; an annular member splined to said sleeve and located thereon between said gear and the adjacent end of said frame; a ring-like friction element shiftable relative to said member; a lever pivoted to said member and adapted when actuated to cause said friction-elements to engage; a collar shiftable on said member and having a conical surface adapted to swing said lever and also having an annular surface adapted to receive the end of said lever and retain it in its operative position; and means for regulating the pressure between said friction-elements produced when said lever is in its operative position.

In witness whereof, I hereunto subscribe my name, as attested by the two subscribing witnesses.

DAVID C. KLAUSMEYER.

Witnesses:
 C. C. SLETE,
 ANNA M. HUSSIAN.